US008683351B2

(12) United States Patent
Cheng et al.

(10) Patent No.: US 8,683,351 B2
(45) Date of Patent: Mar. 25, 2014

(54) CHAT USER INTERFACE FOR THREADED TEXT CHAT SYSTEMS

(75) Inventors: Li-Te Cheng, Maiden, MA (US); Bryan W. Clark, Cambridge, MA (US); Susanne C. Hupfer, Lexington, MA (US); John Patterson, Carlisle, MA (US); Steven I. Ross, South Hamilton, MA (US)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 10/973,124

(22) Filed: Oct. 26, 2004

(65) Prior Publication Data

US 2006/0090137 A1 Apr. 27, 2006

(51) Int. Cl.
  *G06F 3/00* (2006.01)
(52) U.S. Cl.
  USPC .................. 715/753; 715/758; 715/759
(58) Field of Classification Search
  USPC .............. 715/758, 753, 751, 759; 709/204
  See application file for complete search history.

(56) References Cited

U.S. PATENT DOCUMENTS

| 5,949,414 | A | 9/1999 | Namikata et al. |
| 6,256,663 | B1 | 7/2001 | Davis |
| 6,346,952 | B1 | 2/2002 | Shtivelman |
| 6,515,681 | B1 | 2/2003 | Knight |
| 6,630,944 | B1 * | 10/2003 | Kakuta et al. ............... 715/758 |
| 6,792,448 | B1 * | 9/2004 | Smith ......................... 709/204 |
| 6,795,093 | B1 * | 9/2004 | Chesley et al. .............. 715/751 |
| 7,185,285 | B2 * | 2/2007 | Van Dok et al. ............ 715/753 |
| 2002/0089537 | A1 | 7/2002 | Balasubramanian |
| 2002/0130904 | A1 | 9/2002 | Becker et al. |
| 2004/0054737 | A1 | 3/2004 | Daniell |
| 2006/0031560 | A1 * | 2/2006 | Warshavsky et al. ........ 709/232 |

* cited by examiner

*Primary Examiner* — Omar Abdul-Ali
(74) *Attorney, Agent, or Firm* — Steven M. Greenberg, Esq.; CRGO LAW

(57) ABSTRACT

A chat user interface for threaded text chat systems. The user interface can include a canvas view in which multiple portions of a threaded text tree for a chat session can be rendered separately and concurrently. The user interface further can include a chat participant view, a chat input view and an outline view of an ongoing chat session. Notably, selections of a threaded text tree rendered in the canvas view can be configured for zooming so that certain parts of the threaded text tree can be viewed more readily than other parts of the threaded text tree. Moreover, as new text entries are provided to any branch of the threaded text tree, visual indicators can be activated in the canvas view to alert an end user to the location of the new text entries. Finally, the canvas view can accommodate both imported external objects, such as graphics or links to Web pages, and also a white board region into which notations can be applied by an end user during the course of a chat session.

5 Claims, 3 Drawing Sheets

CHAT USER INTERFACE FOR THREADED TEXT CHAT SYSTEMS

BACKGROUND OF THE INVENTION

1. Statement of the Technical Field

The present invention relates to the field of collaborative computing and more particularly to instant messaging and chat systems.

2. Description of the Related Art

Real time communications systems provide a substantial enhancement over more traditional, asynchronous communications systems. Electronic mail delivery systems, the prototypical asynchronous communications systems, in its time represented a giant leap forward in respect to global interpersonal communications. Prior to electronic mail, individuals primarily communicated via telephone, facsimile and post. With electronic mail, however, individuals expect near instant delivery of text, and even imagery, audio and video, without incurring the delay typical of the postal system, or the expense associated with telephony and fax technologies.

Despite the ubiquity of electronic mail, asynchronous communications systems lack several elements common in the realm of real time communications systems. In particular, the seemingly instant delivery of a message cannot be experienced in the world of electronic mail. In an real-time society, the minor latencies associated with electronic mail often cannot be suitable for the task at hand where a real-time conversation will be required in addressing a problem or performing a collaborative task. More importantly, often the feel and nature of a "conversation" as it is known to human beings only can be approximated through real time communications where the participants to a conversation feel the spontaneity of an exchange of ideas, much as is the case in a live, face-to-face conversation.

Instant messaging software is becoming increasingly popular as a tool for computer-mediated communication. Conventional chat systems are synchronous in nature in that participants converse with one another in real-time or nearly real-time, by composing and transmitting messages to one another when the participants are online and able to respond. Chat software typically features two "panes": one pane for composing, editing and transmitting a message, and another pane for displaying a running record of the conversation. Generally, participants "take turns" sending messages, which appear to all participants as a linear sequence in the display pane; all participants see the same stream of messages. As more messages are exchanged in a chat system, the record of the conversation can become longer, causing the record pane to scroll out of the visible display area thus necessitating the use of scrollbars to fully access the entire record.

Despite the popularity of instant messaging systems, there are some well-recognized drawbacks. One drawback includes the general lack of some floor-control mechanisms so that participants to a chat need not compete with one another to have the "next turn" and to contribute to the single "leading edge" of the conversation. Another drawback includes the incompatibility of the serial nature of "turns" with the semantically parallel nature of an underlying conversation. For example, participants to a chat can discuss more than one topic concurrently, and comments relating to the various topics can appear interspersed in a serial record of the chat. Moreover, in the course of a series of messages regarding a single topic, a chat participant can respond to an earlier comment on an unrelated theme. As a result, the serial record easily can become confusing and ambiguous.

Some research systems have been designed to address some of these concerns. "Threaded Text Chat", for instance, aims to improve upon conventional chat by providing a threaded discussion tree with which participants can synchronously interact. "Turns" in a threaded text chat are explicit responses linked to previous comments while message indentations indicate the tree structure of the conversation. The threaded, real-time tree approach enjoys a few advantages over conventional chat systems. First, multiple coherent conversations can be conducted simultaneously. Second, multiple users can take turns at the same time. Third, users can collapse branches of the conversation they no longer find relevant. And finally, a conversation transcript is less prone to ambiguity.

Nevertheless, synchronous threaded chat systems introduce a new set of problems. Most notably, there is no one "leading edge" or point of focus for the conversation which can cause users to have difficulty tracking new messages. In some cases, new responses even can be added to distant branches of the threaded discussion tree, particularly where the distant branches have already scrolled out of view of the end user. When a new response is added to a distant branch of the threaded discussion tree, there is no obvious way to bring the new response to the attention of the end user.

SUMMARY OF THE INVENTION

The present invention addresses the deficiencies of the art in respect to threaded text chat systems and provides a novel and non-obvious chat user interface for threaded text chat systems. In an accordance with the present invention, a chat user interface for threaded text chat systems can include a chat input view configured to accept text input for posting to a threaded text chat session; a chat participant view configured to display a listing of participants to the threaded text chat session; an outline view configured to display a complete hierarchical view of the threaded text chat session; and, a canvas view configured to separately and concurrently display at least two branches of the threaded text chat session. In this regard, the complete hierarchical view can include one or more collapsible and expandable branches of a tree structure representing the threaded text chat session.

Preferably, the canvas view can include logic programmed to manage a pinning up of a selected node of a branch displayed in the canvas view. In this regard, the pinning up can include a graphical drag and drop manipulation of the selected node to a region of the canvas view which differs from a region of the canvas view of a branch containing the selected node. Moreover, the canvas view further can include a context menu providing access to a zoom operation. The zoom operation can cause a visual zooming of the canvas view. Alternatively, the zoom operation can cause a visual zooming of a selected portion of a branch displayed in the canvas view.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a chat user interface for threaded text chat systems. The user interface can include a canvas view in which multiple portions of a threaded text tree for a chat session can be rendered separately and concurrently. The user interface further can include a chat participant view, a chat input view and an outline view of an ongoing chat session. Notably, selections of a threaded text tree rendered in the canvas view can be configured for zooming so that certain parts of the threaded text tree can be viewed more readily than other parts of the threaded text tree. Moreover, as new text entries are provided to any branch of the threaded text tree, visual indicators can be activated in the canvas view to alert an end user to the location of the new text entries. Finally, the canvas view can accommodate both imported external objects, such as graphics or links to Web pages, and also a white board region into which notations can be applied by an end user during the course of a chat session.

Figure 1:
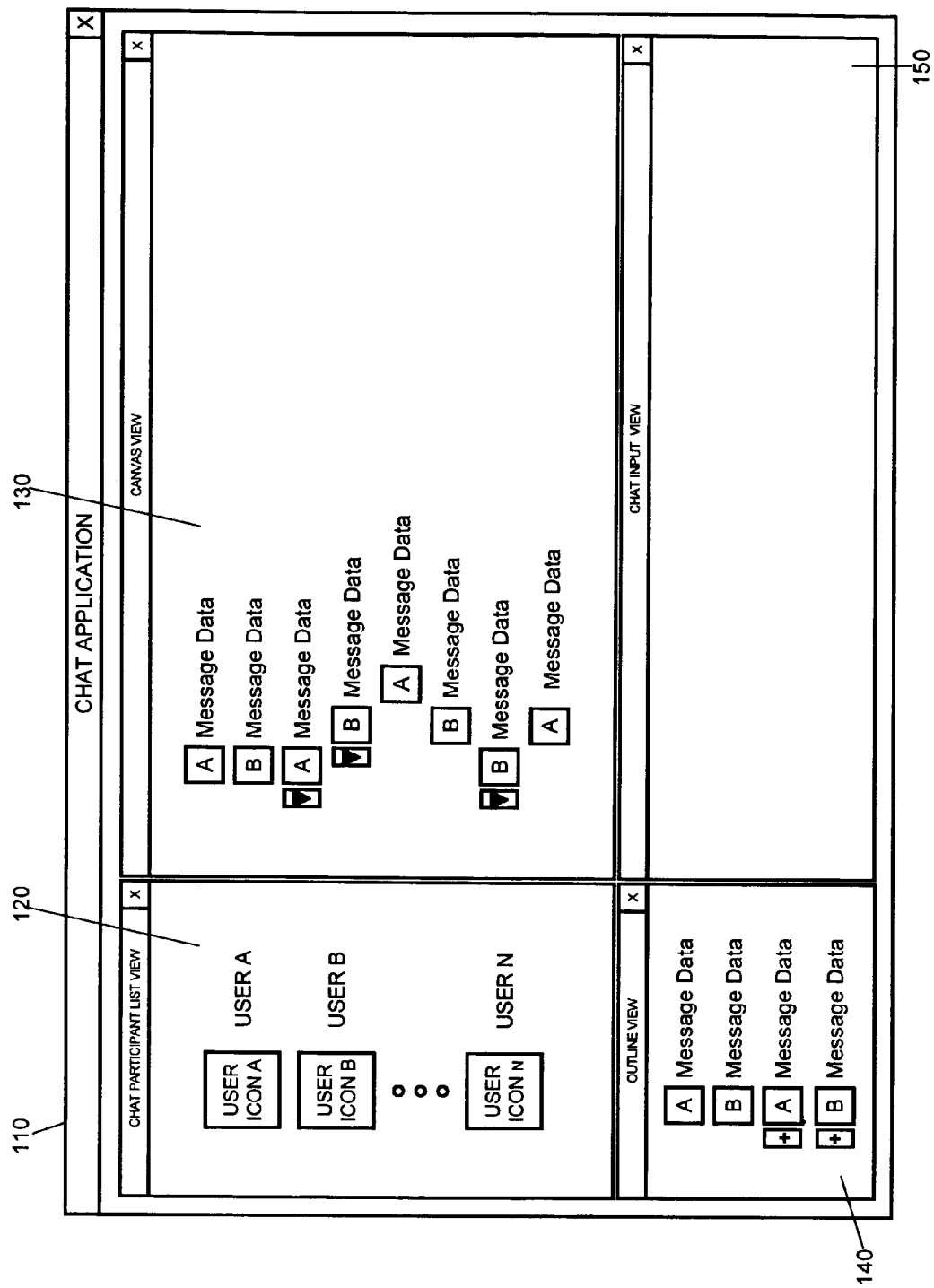
FIG. 1 is a screen shot of a chat user interface for threaded text chat systems illustrating a canvas view of a threaded text chat session.

In more particular illustration of the inventive arrangements, FIG. 1 is a screen shot of a chat user interface for threaded text chat systems illustrating a canvas view of a threaded text chat session. The user interface 110 can include each of a chat participant view 120, a canvas view 130, an outline view 140 and a chat input view 150. The chat participant view 120 can provide a listing of each participant to a chat session. Advantageously, each participant can be associated with a particular mode of presentation, such as a unique shading, coloring, text style or iconic representation as shown in FIG. 1. In this way, postings by any one participant will be readily associated with the participant based upon the mode of presentation of the posting.

The chat input view 150 can provide a text input field through which an end user can create a posting of message data to the chat session. By comparison, the outline view 140 can provide a complete hierarchical presentation of a chat session in threaded chat tree format. Different branches of the tree can be expanded or collapsed at the discretion of the end user. Notably, new chat messages can be associated with a node in the chat tree represented in the outline view 140 based upon a contemporary selection of a node in the chat tree. In this regard, newly added chat messages can be appended to the chat tree as a leaf to a selected node. Where no node has been selected in the chat tree, a newly added chat message can become a leaf of the last posted chat message in the chat tree.

Significantly, the canvas view 130 can provide a flexible viewing area for individual portions of the chat tree. In particular, different branches of a chat tree can be pinned to the canvas concurrently with the display of other portions of the chat tree in a different region of the canvas view 130. In this way, portions of interest in the chat tree can be viewed and managed without requiring a more rigorous navigation of the chat tree in the outline view 140. In more particular illustration, FIG. 2 is a screen shot of the chat user interface of FIG. 1 illustrating a process for pinning up a portion of a threaded text chat session in the canvas view.

Figure 2:
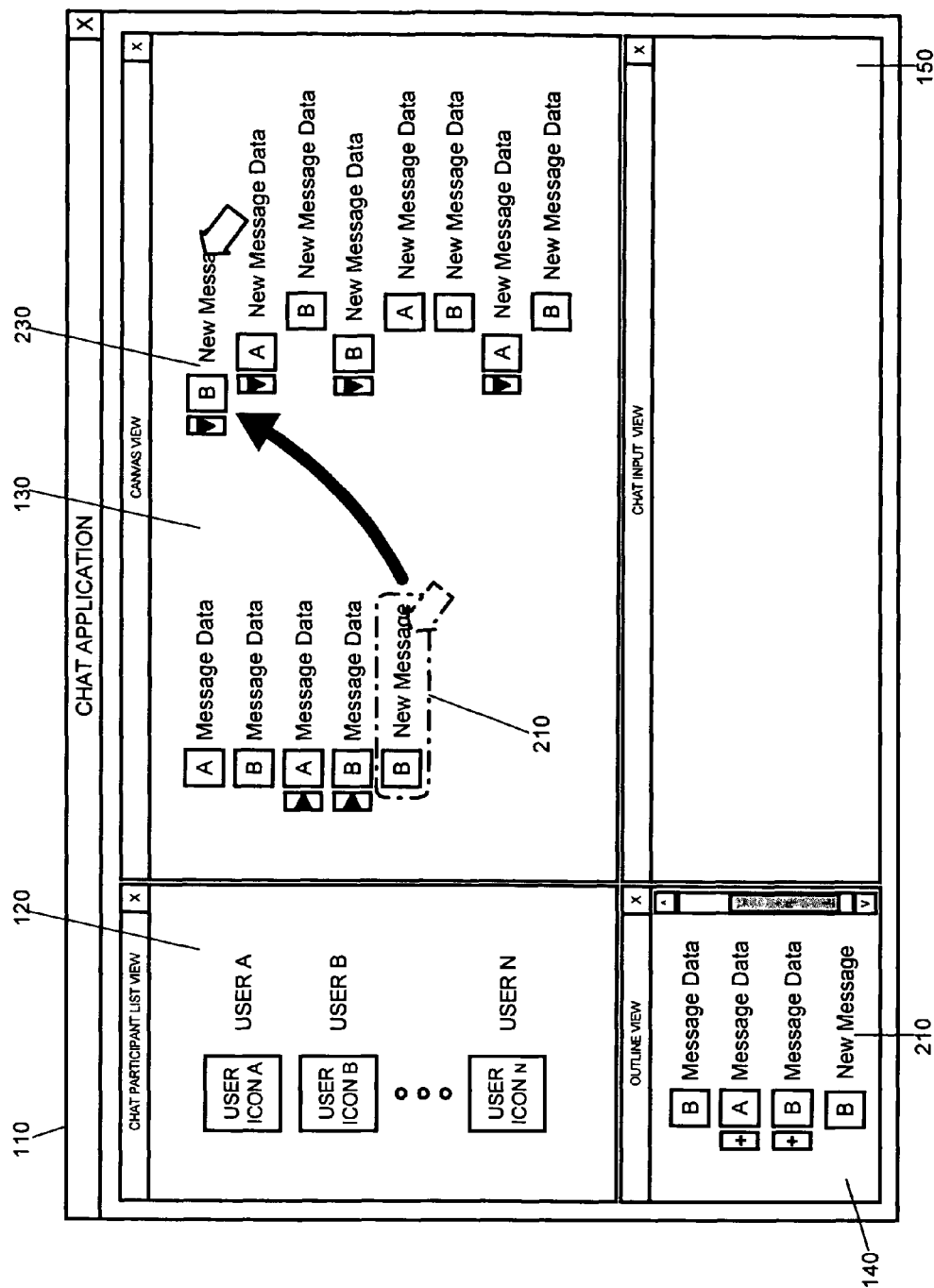
FIG. 2 is a screen shot of the chat user interface of FIG. 1 illustrating a process for pinning up a portion of a threaded text chat session in the canvas view; and, FIG. 3 is a screen shot of the chat user interface of FIG. 1 illustrating processes for zooming into a portion of a threaded text chat session, for managing a white board in the canvas view, and for importing external data into the canvas view.

Referring to FIG. 2, a new message 210 can be posted to the chat tree as shown in the outline view 140. To the extent that a local portion of the chat tree also has been pinned to the canvas view 130, the new message 210 can be rendered in the canvas view 130 as well. To draw attention to the new message 210, the visual appearance of the new message 210 can be modified such as through highlighting, font style, or particular iconic association. Subsequently, the visual appearance of the new message 210 can be normalized when it is clear that the message has been viewed, or possibly after a period of time has elapsed.

To focus on the "leading edge" of the chat session reflected by the new message 210, the conversation which subsequently can unfold in relation to the new message 210 can be isolated and separated from the existing chat tree in the canvas view 130 in the form of a pinned up branch 230. Specifically, the end user can select the node of interest in the chat tree, for instance the new message 210, and the end user can drag and drop the node to a different region of the canvas view 130. Subsequent postings to a subordinate node of the new message 210 can be hierarchically organized in the pinned up branch 230. Consequently, end users can view the branch of interest without undertaking a more involved traversal of the entire chat tree in the outline view 140.

Figure 3:
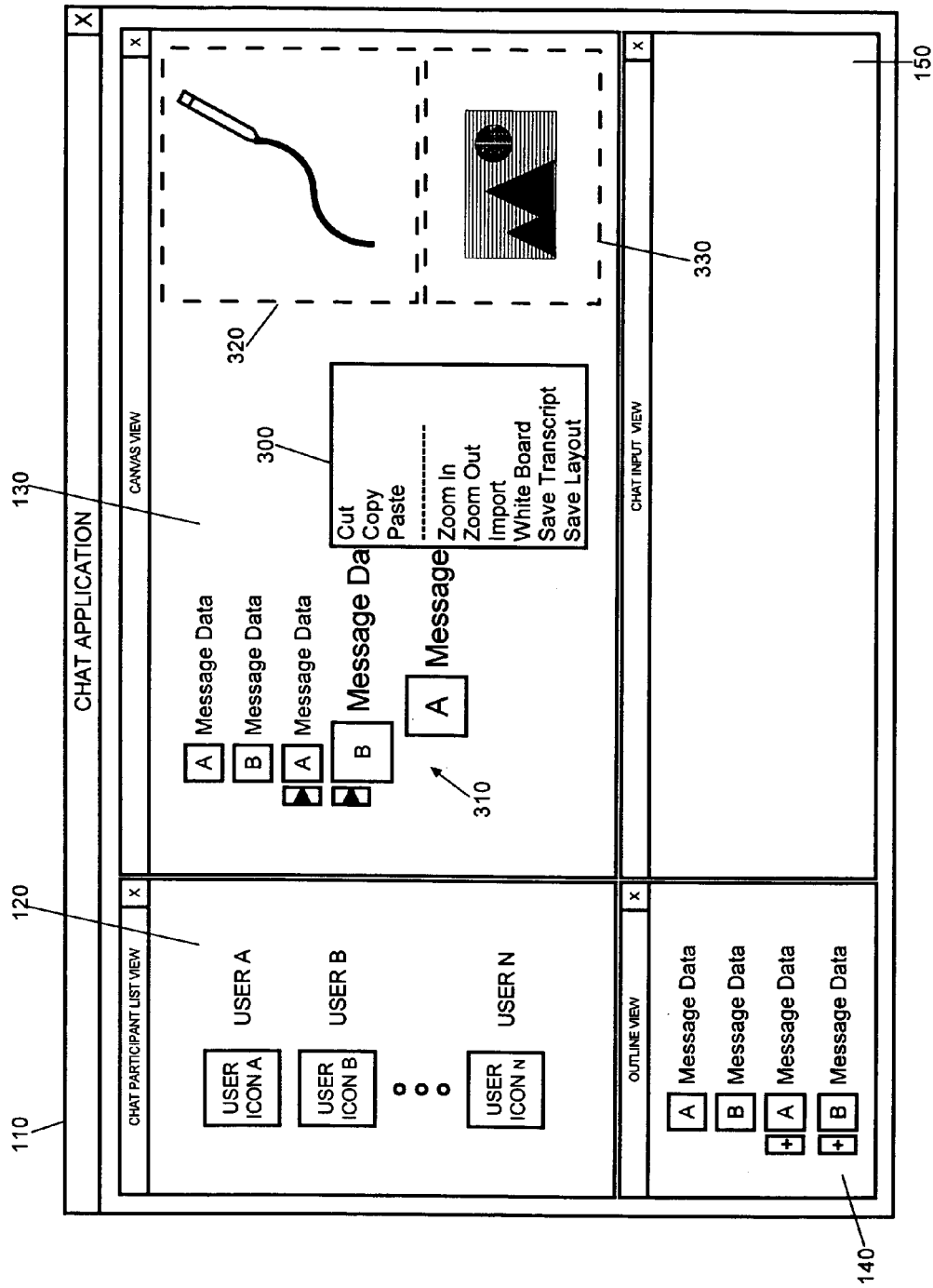

Importantly, the user interface 110 can include several other functional aspects which facilitate the management of a threaded text chat session. Specifically, FIG. 3 is a screen shot of the chat user interface of FIG. 1 illustrating several additional functional aspects such as a processes for zooming into a portion of a threaded text chat session, for managing a white board in the canvas view, and for importing external data into the canvas view. In particular, the entirety of the canvas area 130 can be enlarged or contracted so that the entire chat tree for a chat session can be viewed, or only a specific portion of the chat tree can be viewed without requiring the use of scroll bar controls.

Referring to FIG. 3, a branch 310 of the chat tree rendered in the canvas view 130 can be visually zoomed through a selection of the pertinent branch of the chat tree, or through a selection of a set of nodes in the chat tree. Based upon the selection, a context menu 300 can be activated which can provide the end user with the option to visually enlarge or contract the selection. Accordingly, interesting portions of the chat session can be more readily viewed while less interesting portions can be obscured. Moreover, the canvas area 130, due to its customizable view can be personalized to an individual user, though the personalization can be hidden from other participants to the chat session. Alternatively, the personalization of the canvas view 130 can be shared with other participants and a policy can be applied to determine which participants can view the personalization.

The context menu 300 can include access to other important features, including an import feature. The import feature can activate logic for inserting an external object 330 into the canvas view 130, such as an image, a presentation, a text file, a multimedia file, or a network address. The context menu 300 further can include a white board feature. The white board feature can activate a white board region 320 of the canvas view 130 in which the end user can record written notes. Finally, through the context menu, either the transcript of the chat session, or the personalization of the canvas view 130 can be persisted for later retrieval by the end user. In all cases, it will be recognized that the context menu can be implemented in any number of forms, including a menu bar, a tool bar, and a floating context menu, to name a few.

The skilled artisan will recognize a number of advantages provided by the chat system user interface of the present invention over conventional sequential chat systems. First, the chat session user interface of the present invention permits multiple conversations to be carried out simultaneously, with multiple users taking turns at the same time, without introducing ambiguity into the chat session. The chat user interface of the present invention further provides for the navigation of a hierarchical tree structure for the chat session which allows end users to both expand branches of the discussion which are of interest, and also to collapse branches of the discussion that no longer are found to be important or interesting. The persistence of the tree structure allows end users to save unambiguous, coherent transcripts of the conversation, showing the nature of the conversation that has developed.

Likewise, the skilled artisan will recognize a number of advantages provided by the chat system user interface of the present invention over convention threaded chat systems. First, in the chat user interface of the present invention, one can zoom into or out of parts of the conversational structure which allows the end user to see a high-level overview of the structure of the chat session and nature of the chat session at a glance. For instance, the structure may show heavy activity in a certain part of the tree, indicating a popular topic. Conversely, predominance of certain colors or icons in parts of the tree indicate which users are contributing the most to or dominating certain topics of conversation. In this regard, colors can also be used to highlight "leading edges" of the conversation, and if the conversation has been zoomed out, these leading edges will become more obvious at a glance.

Importantly, by allowing messages and message branches to be posted or dragged to other positions or window panes in the canvas view of the user interface, users can achieve a more customized view of the conversation, and can enjoy greater control over where the information of most relevance or timeliness to the end user will appear. Additionally, by allowing the chat user interface to automatically post messages and message branches to other positions or window panes in the canvas view, according to policies, rules, user preferences, or subscriptions, the chat user interface can assist the end user in becoming better abreast of new, relevant information.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for managing a threaded text chat session in a chat session user interface, the method comprising the steps of:
   rendering at least a branch of a chat tree in a canvas view of the chat session user interface;
   selecting an instance of a portion of said branch; and,
   concurrently and separately rendering a different instance of said selected portion along with said selected instance and said branch in said canvas view.

2. The method of claim 1, further comprising the step of substantially simultaneously adding a new posting to the threaded text chat session to a designated node of said branch and to a corresponding node in said separately rendered selected portion in said canvas view.

3. The method of claim 1, further comprising the step of adding an associated mode of presentation to a posted message in said chat tree which is indicative of a participant posting said posted message.

4. A computer readable storage medium having stored thereon a computer program for managing a threaded text chat session in a chat session user interface, the computer program comprising a routine set of instructions which when executed by a machine causes the machine to perform the steps of:
   rendering at least a branch of a chat tree in a canvas view of the chat session user interface;
   selecting an instance of a portion of said branch; and,
   concurrently and separately rendering a different instance of said selected portion along with said selected instance and said branch in said canvas view.

5. The computer readable storage medium of claim 4, further comprising an additional set of instructions for causing the machine to additionally perform the step of substantially simultaneously adding a new posting to the threaded text chat session to a designated node of said branch and to a corresponding node in said separately rendered selected portion in said canvas view.

* * * * *